C. NELSON.

TORPEDO.

No. 7,016. Reissued March 28, 1876.

*Witnesses:*
Edwin James.
John D. Jones.

*Inventor:*
Charles Nelson
per J. E. J. Holmead.
Attorney.

UNITED STATES PATENT OFFICE.

CHARLES NELSON, OF EAST NEW YORK, N. Y.

IMPROVEMENT IN TORPEDOES.

Specification forming part of Letters Patent No. 136,000, dated February 18, 1873; reissue No. 7,016, dated March 28, 1876; application filed March 17, 1876.

DIVISION D.

*To a'l whom it may concern:*

B it known that I, CHARLES NELSON, of East New York, in the county of Kings and State of New York, invented certain Improvements in Torpedoes, on which Letters Patent of the United States were granted to me February 18, 1873, No. 136,000; that I am now the sole owner of said Letters Patent; and that the following is a full, clear, and exact description of the same, reference being had to the accompanying drawing, and the letters of reference marked thereon, making part of this specification, in which—

Figure 1:
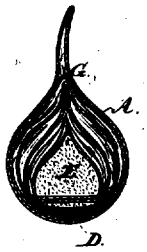
Figure 2:
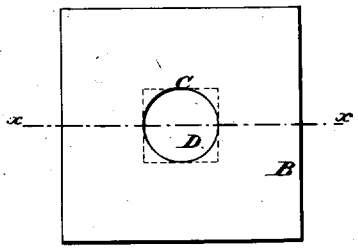
Figure 3:
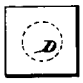
Figure 4:
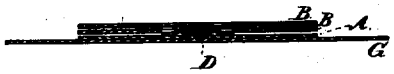

Figure 1 is a sectional elevation of my improved torpedo. Fig. 2 is a plan view of the inclosing papers. Fig. 3 is a plan view of the paper containing the fulminate. Fig. 4 is a sectional view on the line *x x*, Fig. 2.

My invention consists of a torpedo in which the fulminate is separated from the gravel and other filling and inclosed in a paper sack and fixed on the center of the paper wrapper so as to be at the bottom part of the completed torpedo, which is most likely to strike when thrown, and, together with the filling, it is either inclosed in one wrapper or package of two or more plies of strong paper, except at their bottom, where each inner piece of paper has a large hole forming a kind of well, in the bottom of which the fulminate is placed, and the whole, including an exterior thin fancy-colored paper, are folded over the powder and secured by twisting together and gumming the twisted parts. The object is to guard against explosion by concussion of the sides of the torpedo, and to provide a wrapper or case that will not break open easily when subject to concussion, as the torpedoes now made do to such extent that if one in a mass or package explodes the whole will be fired.

The construction and operation of my invention are as follows: A is the outer ply of strong paper for inclosing the whole. B represents two inner plies of the same paper, but having a large hole, C, at the center forming a little well or pocket when laid flat, as represented in Fig. 4. D represents a little paper piece with the fulminate attached to one side, (and which feature constitutes the distinct subject matter of a division of this reissue,) which is placed on the sheet A at the center or in the bottom of said pocket, then a charge of gravel or other filling, E, is put on the paper above the fulminate and the paper A B. Also an outer and larger piece of thin colored paper G is folded up around the contents and twisted and gummed together, as shown in Fig. 1, making an oval package with a vertical conical extension, with the center of gravity near the bottom, so that when thrown from the hand to be exploded the bottom in which the fulminate is most exposed will strike the object against which the torpedo is thrown and cause it to explode; but this part covering the fulminate being considerably elastic and very strong the torpedo will be much less liable to explode by the shock of another exploded by the side of it than the ordinary torpedoes, and in all other parts except the bottom such concussions will be absolutely harmless because of not being expended on the fulminate or against it. The outer covering of colored paper is employed merely to improve the appearance of the package.

What I claim as new, and desire to secure by Letters Patent of the United States, is—

A torpedo consisting of the wrapper A, with or without an outer covering of tissue or other colored paper, and having the fulminate attached to one side of a piece of paper, D, separate from the other filling, and inclosed in one or more pieces, B, of strong paper having a hole, C, at the center, and all folded, twisted, and pasted together, substantially as described.

In testimony whereof I have signed my name to this specification before two subscribing witnesses.

CHAS. NELSON.

Witnesses:
EDWARD F. LINTON,
RICHD. PICKERING.